United States Patent
Huang

(10) Patent No.: US 11,563,712 B2
(45) Date of Patent: Jan. 24, 2023

(54) METHOD FOR DOMAIN NAME QUERY, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/325,139

(22) Filed: May 19, 2021

(65) Prior Publication Data

US 2021/0273907 A1 Sep. 2, 2021

Related U.S. Application Data

(63) Continuation of application No. PCT/CN2019/109059, filed on Sep. 29, 2019.

(30) Foreign Application Priority Data

Nov. 21, 2018 (CN) .......................... 201811392671.1

(51) Int. Cl.
*H04L 61/4511* (2022.01)
(52) U.S. Cl.
CPC ................ *H04L 61/4511* (2022.05)
(58) Field of Classification Search
None
See application file for complete search history.

(56) References Cited

U.S. PATENT DOCUMENTS

| 8,755,389 B1* | 6/2014 | Poutievski ............ H04L 45/245 370/395.31 |
| 2006/0187820 A1 | 8/2006 | French |

(Continued)

FOREIGN PATENT DOCUMENTS

| CN | 101080098 A | 11/2007 |
| CN | 101616079 A | 12/2009 |

(Continued)

OTHER PUBLICATIONS

China First Office Action with English Translation for CN Aapplication 201811392671.1 dated Dec. 27, 2019. (24 pages).

(Continued)

*Primary Examiner* — Joshua Joo
(74) *Attorney, Agent, or Firm* — Young Basile Hanlon & MacFarlane, P.C.

(57) ABSTRACT

An electronic device, a method for domain name query, and related products are provided, which are for an electronic device. The method includes the following. Whether the electronic device enables a link aggregation (SLA) is detected in response to detecting an Internet protocol (IP) address query request for a target domain name. Multiple communication links enabled by the SLA are determined in response to detecting that the SLA is enabled. An IP address corresponding to the target domain name is obtained by querying multiple domain name system (DNS) servers through at least one target communication link of the multiple communication links.

7 Claims, 3 Drawing Sheets

(56) References Cited

U.S. PATENT DOCUMENTS

| | | | | |
|---|---|---|---|---|
| 2006/0271707 | A1* | 11/2006 | Cheline | H04L 63/0272 709/245 |
| 2014/0089503 | A1* | 3/2014 | Thyni | H04L 61/1511 709/224 |
| 2014/0126388 | A1* | 5/2014 | Shin | H04W 48/20 370/252 |
| 2014/0201383 | A1* | 7/2014 | Kuehnel | H04W 88/06 709/231 |
| 2014/0244860 | A1 | 8/2014 | A.R. | |
| 2016/0269353 | A1* | 9/2016 | Chan | H04L 12/6418 |
| 2017/0134253 | A1* | 5/2017 | Wang | H04L 61/1511 |
| 2017/0257308 | A1* | 9/2017 | Cropper | H04L 67/10 |
| 2017/0280386 | A1 | 9/2017 | Xu et al. | |
| 2018/0063009 | A1* | 3/2018 | Dhanabalan | H04L 47/25 |
| 2018/0262461 | A1* | 9/2018 | Chan | H04L 12/6418 |
| 2019/0081922 | A1* | 3/2019 | Vilenski | H04L 61/1552 |

FOREIGN PATENT DOCUMENTS

| | | |
|---|---|---|
| CN | 101764855 A | 6/2010 |
| CN | 102244613 A | 11/2011 |
| CN | 202276355 U | 6/2012 |
| CN | 103037025 A | 4/2013 |
| CN | 104717312 A | 6/2015 |
| CN | 105991347 A | 10/2016 |
| CN | 106067890 A | 11/2016 |
| CN | 106657426 A | 5/2017 |
| CN | 106790340 A | 5/2017 |
| CN | 108228562 A | 6/2018 |
| CN | 108259237 A | 7/2018 |
| CN | 108259372 A | 7/2018 |
| CN | 108777666 A | 11/2018 |
| EP | 1589781 A2 | 10/2005 |
| EP | 3301969 A1 | 4/2018 |
| WO | 2013041350 A1 | 3/2013 |
| WO | 2016038611 A1 | 3/2016 |

OTHER PUBLICATIONS

China Second Office Action with English Translation for CN Application 201811392671.1 dated Apr. 15, 2020. (22 pages).

China Notice of Registration with English Translation for CN Application 201811392671.1 dated Oct. 12, 2020. (10 pages).

International Search Report with English Translation for International Application PCT/CN2019/109059 dated Jan. 8, 2020. (12 pages).

Beser 3COM B: "DHCP Option for PacketCable VoIP Client Configuration; draft-ietf-dhc-packetcable-OO. txt", mailed Mar. 1, 2000.

Vasileios Pappas et al: "Impact of configuration errors on DNS robustness", mailed Aug. 30, 2004.

Mockapetris P: "RFC 1034 Domain Names Concepts and Facilities", mailed Nov. 1, 1987.

Extended European Search Report for EP Application 19886658.4 dated Oct. 22, 2021. (10 pages).

Chinese Notice of granting the exclusive right of the invention with English Translation for CN Application 202011539673.6 dated Mar. 15, 2022. (10 pages).

Chinese Notice of granting the exclusive right of the invention with English Translation for CN Application 202011546514.9 dated Mar. 15, 2022. (10 pages).

Communication pursuant to Article 94(3) EPC for EP Application 19886658.4 dated Jun. 10, 2022. (6 pages).

* cited by examiner

METHOD FOR DOMAIN NAME QUERY, ELECTRONIC DEVICE, AND STORAGE MEDIUM

CROSS-REFERENCE TO RELATED APPLICATION(S)

This application is a continuation of International Application No. PCT/CN2019/109059, filed on Sep. 29, 2019, which claims priority to Chinese Patent Application No. 201811392671.1, filed on Nov. 21, 2018, the entire disclosures of both of which are hereby incorporated by reference.

TECHNICAL FIELD

This disclosure relates to the technical field of electronic device, and particularly to a method for domain name query, an electronic device, and a storage medium.

BACKGROUND

The domain name system (DNS) is a core service of the Internet. Specifically, it is a distributed database where domain names and Internet protocol (IP) addresses are mapped to each other, which can make it easier for people to surf the Internet without having to remember the string of IP addresses that can be directly read by machines. Generally, the domain name query is performed through a single link, and thus, due to changes in network quality and status of domain name servers, efficiency of the query is often not guaranteed.

SUMMARY

According to a first aspect, implementations provide a method for domain name query. The method is for an electronic device. The method includes the following.

Whether the electronic device enables a link aggregation (SLA) is detected in response to detecting an Internet protocol (IP) address query request for a target domain name.

Multiple communication links enabled by the SLA are determined in response to detecting that the SLA is enabled.

An IP address corresponding to the target domain name is obtained by querying multiple DNS servers through at least one target communication link of the multiple communication links.

According to a second aspect, implementations provide an electronic device. The electronic device includes at least one processor and a memory. The memory is coupled to the at least one processor and stores computer executable instructions thereon which, when executed by the at least one processor, causes the at least one processor to execute the method of the first aspect.

According to a third aspect, implementations provide a non-transitory computer readable storage medium. The non-transitory computer readable storage medium is configured to store a computer program which, when executed by a processor, causes the processor to execute the method of the first aspect.

BRIEF DESCRIPTION OF DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings described. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as an electronic device.

The following elaborates the implementations of the disclosure.

Figure 1:
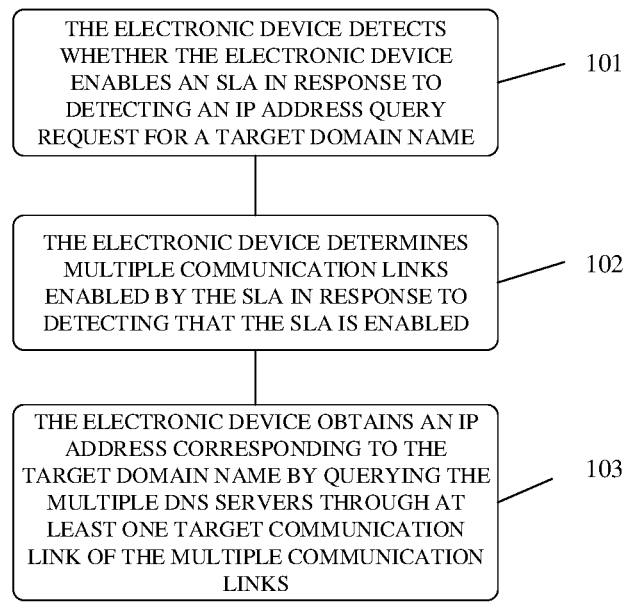
FIG. 1 is a schematic flow chart illustrating a method for domain name query according to implementations.

FIG. 1 is a schematic flow chart illustrating a method for domain name query according to implementations. The method is for an electronic device. As illustrated in FIG. 1, the method begins at 101.

At 101, the electronic device detects whether the electronic device enables an SLA in response to detecting an IP address query request for a target domain name.

The electronic device is equipped with multiple DNS servers, providing multiple queryable domain names.

At 102, the electronic device determines multiple communication links enabled by the SLA in response to detecting that the SLA is enabled.

The SLA can aggregate multiple communication links.

The multiple communication links include only one communication link and/or at least two communication links.

At 103, the electronic device obtains an IP address corresponding to the target domain name by querying the multiple DNS servers through at least one target communication link of the multiple communication links.

According to the implementations, the electronic device detects whether the SLA is enabled in response to detecting the IP address query request for the target domain name, determines the multiple communication links enabled by the SLA in response to detecting that the SLA is enabled, and obtains the IP address corresponding to the target domain name by querying the multiple DNS servers through the at least one target communication link of the multiple communication links. According to the method for domain name query based on the SLA of the above solution, multiple query strategies achieve the multi-link based domain name query, so that, for the received domain name query request, the multi-link based domain name query can be performed. Therefore, the related method for domain name query can be optimized, query failures caused by the single-link based domain name query can be avoided, and a success rate and efficiency of the domain name query can be improved.

In at least one implementation, the electronic device obtains the IP address corresponding to the target domain name by querying the multiple DNS servers through the at least one target communication link of the multiple communication links as follows. The electronic device determines multiple target communication links for a DNS query. The electronic device queries the multiple DNS servers through the multiple target communication links. The electronic device obtains the IP address corresponding to the target domain name.

The multiple target communication links include a first target communication link and a second target communication link.

The multiple DNS servers include DNS1 and DNS2.

According to the implementation, multiple target communication links are formed through link aggregation, and the electronic device can query the multiple DNS servers through the multiple target communication links. It is possible to provide more selectable communication links for domain name query, improve the success rate and efficiency of the domain name query, and optimize the related manners for domain name query.

In at least one implementation, the electronic device determines the multiple target communication links for the DNS query as follows. The electronic device selects the multiple target communication links from the multiple communication links according to a quality parameter of each of the multiple communication links. Alternatively, the electronic device queries a mapping relationship based on a link set containing the multiple communication links as a query identifier, wherein the mapping relationship comprises a correspondence between link sets and target communication links, and obtains the multiple target communication links corresponding to the link set.

In at least one implementation, the quality parameter of each communication link includes link connection status, signal strength, and an information error rate of the communication link.

According to the implementation, the communication link selection is done based on static settings and/or dynamic selection, so as to improve efficiency of communication link selection and ensure that optimal communication links are selected.

In at least one implementation, the multiple target communication links include a first target communication link and a second target communication link, the multiple DNS servers include DNS1 and DNS2, and the electronic device queries the multiple DNS servers through the multiple target communication links as follows. The electronic device queries an R-th domain name on DNS1 through the first target communication link, where R is an integer greater than or equal to 1. The electronic device queries an (R+1)-th domain name on DNS2 through the first target communication link. The electronic device queries an (R+2)-th domain name on DNS1 through the second target communication link. The electronic device queries an (R+3)-th domain name on DNS2 through the second target communication link.

If any query succeeds, the query stops and then a query result is returned.

In an example, electronic device A determines first target communication link B and second target communication link C, where the multiple DNS servers include DNS1 and DNS2, and performs the domain name query as follows. A performs a first domain name query on DNS1 through B; A performs a second domain name query on DNS2 through B; A performs a third domain name query on DNS1 through C; A performs a fourth domain name query on DNS2 through C.

According to the implementation, the domain name query is performed through the multiple target communication links, where the multiple DNS servers are queried through one target communication link and then the multiple DNS servers are queried through the other target communication link, in this way, cross-query is achieved by performing multiple rounds of queries on the multiple DNS servers through each communication link. Through the above method for domain name query, multiple domain names in the multiple DNS servers can be queried in a short time, which improves the efficiency of the domain name query.

In at least one implementation, the multiple target communication links include a first target communication link and a second target communication link, the multiple DNS servers include DNS1 and DNS2, and the electronic device queries the multiple DNS servers through the multiple target communication links as follows. The electronic device queries an S-th domain name on DNS1 through the first target communication link, where S is an integer greater than or equal to 1. The electronic device queries an (S+1)-th domain name on DNS1 through the second target communication link. The electronic device queries an (S+2)-th domain name on DNS2 through the first target communication link. The electronic device queries an (S+3)-th domain name on DNS2 through the second target communication link.

The multiple DNS servers store addresses of multiple DNS domain names.

In an example, electronic device A determines first target communication link B and second target communication link C, where the multiple DNS servers include DNS1 and DNS2, and performs the domain name query as follows. A performs a first domain name query on DNS1 through B; A performs a second domain name query on DNS1 through C;

A performs a third domain name query on DNS2 through B; A performs a fourth domain name query on DNS2 through C.

According to the implementation, the domain name query is performed through the multiple target communication links, where one DNS server is queried through the multiple target communication links and then the other DNS server is queried through the multiple target communication links. That is, multiple queries are performed on each DNS server through target communication links and as such, cross-query through target communication links is achieved. It is possible to reduce query failures caused by communication link failures during the query and improve the success rate of the domain name query.

In at least one implementation, the multiple target communication links include a first target communication link and a second target communication link, the multiple DNS servers include DNS1 and DNS2, and the electronic device queries the multiple DNS servers through the multiple target communication links as follows. The electronic device queries an M-th domain name on DNS1 through the first target communication link, where M is an integer greater than or equal to 1. The electronic device queries an (M+1)-th domain name on DNS2 through the first target communication link. The electronic device queries an (M+2)-th domain name on DNS1 through the second target communication link. The electronic device queries an (M+3)-th domain name on DNS2 through the second target communication link. The electronic device queries an (M+4)-th domain name on DNS1 through the first target communication link. The electronic device queries an (M+5)-th domain name on DNS1 through the second target communication link. The electronic device queries an (M+6)-th domain name on DNS2 through the first target communication link. The electronic device queries an (M+7)-th domain name on DNS2 through the second target communication link.

The multiple target communication links include but are not limited to the first target communication link and the second target communication link.

In an example, electronic device A determines first target communication link B and second target communication link C, where the multiple DNS servers include DNS1 and DNS2, and performs the domain name query as follows. A performs a first domain name query on DNS1 through B; A performs a second domain name query on DNS2 through B; A performs a third domain name query on DNS1 through C; A performs a fourth domain name query on DNS2 through C; A performs a fifth domain name query on DNS1 through B; A performs a sixth domain name query on DNS1 through C; A performs a seventh domain name query on DNS2 through B; A performs an eighth domain name query on DNS2 through C.

According to the implementation, the above query method combines multiple rounds of queries on each DNS server through target communication links and multiple rounds of queries on the multiple DNS servers through each communication link, with this complex query method, the accuracy and success rate of the domain name query can be ensured to the greatest extent.

In at least one implementation, the electronic device obtains the IP address corresponding to the target domain name by querying the multiple DNS servers through the at least one target communication link of the multiple communication links as follows. The electronic device determines one target communication link for a DNS query. The electronic device queries the multiple DNS servers through the one target communication link. The electronic device obtains the IP address corresponding to the target domain name.

The multiple DNS servers include DNS1 and DNS2.

In an example, the electronic device performs a first domain name query on DNS1 through communication link A. If the query fails, the electronic device performs a second domain name query on DNS2 through communication link A. If the query still fails, the electronic device performs a third domain name query on DNS1 through communication link A. If the query still fails, the electronic device performs a fourth domain name query on DNS2 through communication link A.

In an example, the electronic device performs a first domain name query on DNS1 through communication link B. If the query fails, the electronic device performs a second domain name query on DNS1 through communication link B. If the query still fails, the electronic device performs a third domain name query on DNS2 through communication link B. If the query result still fails, the electronic device performs a fourth domain name query on DNS2 through communication link B.

According to the implementation, the domain name query is performed on multiple domain names in different DNS servers through one same communication link. As such, the time consumed due to unnecessary operations in the query can be reduced, the efficiency of the domain name query can be improved, and high-efficiency of the domain name query can be ensured.

In at least one implementation, the electronic device determines one target communication link for the DNS query as follows. The electronic device selects one target communication link from the multiple communication links according to a quality parameter of each of the multiple communication links. Alternatively, the electronic device queries a mapping relationship based on a link set containing the multiple communication links as a query identifier, wherein the mapping relationship comprises a correspondence between link sets and target communication links, and obtains one target communication link corresponding to the link set.

In at least one implementation, the quality parameter of each communication link includes link connection status, signal strength, and an information error rate of the communication link.

According to the implementation, the communication link selection is done based on static settings and/or dynamic selection, so as to improve efficiency of communication link selection and ensure that the optimal communication link is selected.

Figure 2:
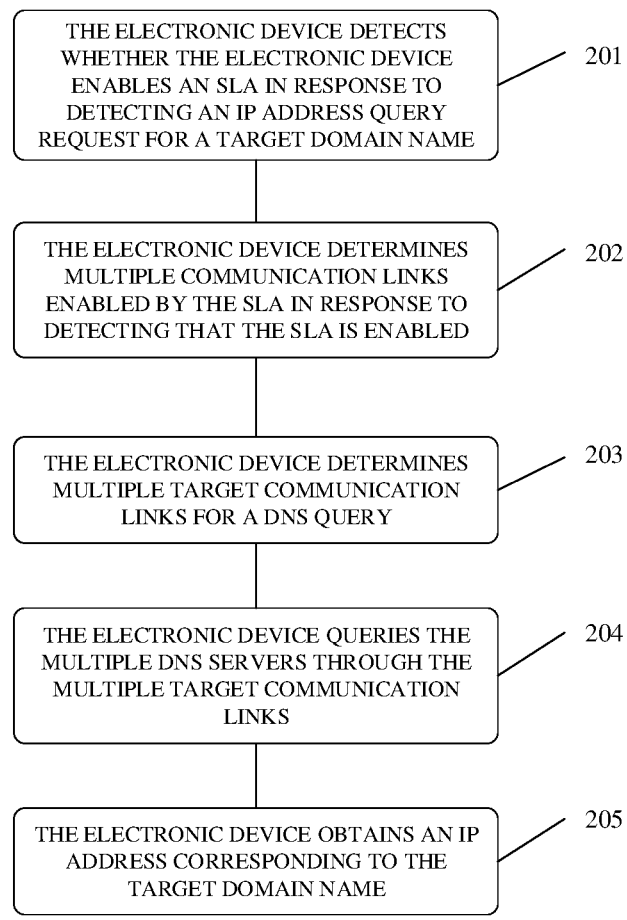
FIG. 2 is a schematic flow chart illustrating a method for domain name query according to other implementations.

FIG. 2 is a schematic flow chart illustrating a method for domain name query according to other implementations. The method is for an electronic device equipped with multiple DNS servers. In view of the implementation of FIG. 1, as illustrated in FIG. 2, the method begins at 201.

At 201, the electronic device detects whether the electronic device enables an SLA in response to detecting an IP address query request for a target domain name.

At 202, the electronic device determines multiple communication links enabled by the SLA in response to detecting that the SLA is enabled.

At 203, the electronic device determines multiple target communication links for a DNS query.

At 204, the electronic device queries the multiple DNS servers through the multiple target communication links.

At 205, the electronic device obtains an IP address corresponding to the target domain name.

According to the implementations, the electronic device detects whether the SLA is enabled in response to detecting the IP address query request for the target domain name, determines the multiple communication links enabled by the SLA in response to detecting that the SLA is enabled, and obtains the IP address corresponding to the target domain name by querying the multiple DNS servers through the at least one target communication link of the multiple communication links. According to the method for domain name query based on the SLA of the above solution, multiple query strategies achieve the multi-link based domain name query, so that, for the received domain name query request, the multi-link based domain name query can be performed. Therefore, the related method for domain name query can be optimized, query failures caused by the single-link based domain name query can be avoided, and a success rate and efficiency of the domain name query can be improved.

Furthermore, according to the implementation, the electronic device enables the multiple target communication links through link aggregation and queries the multiple DNS servers through the multiple target communication links. It is possible to provide more selectable communication links for domain name query, improve the success rate and efficiency of the domain name query, and optimize the related manners for domain name query.

Figure 3:
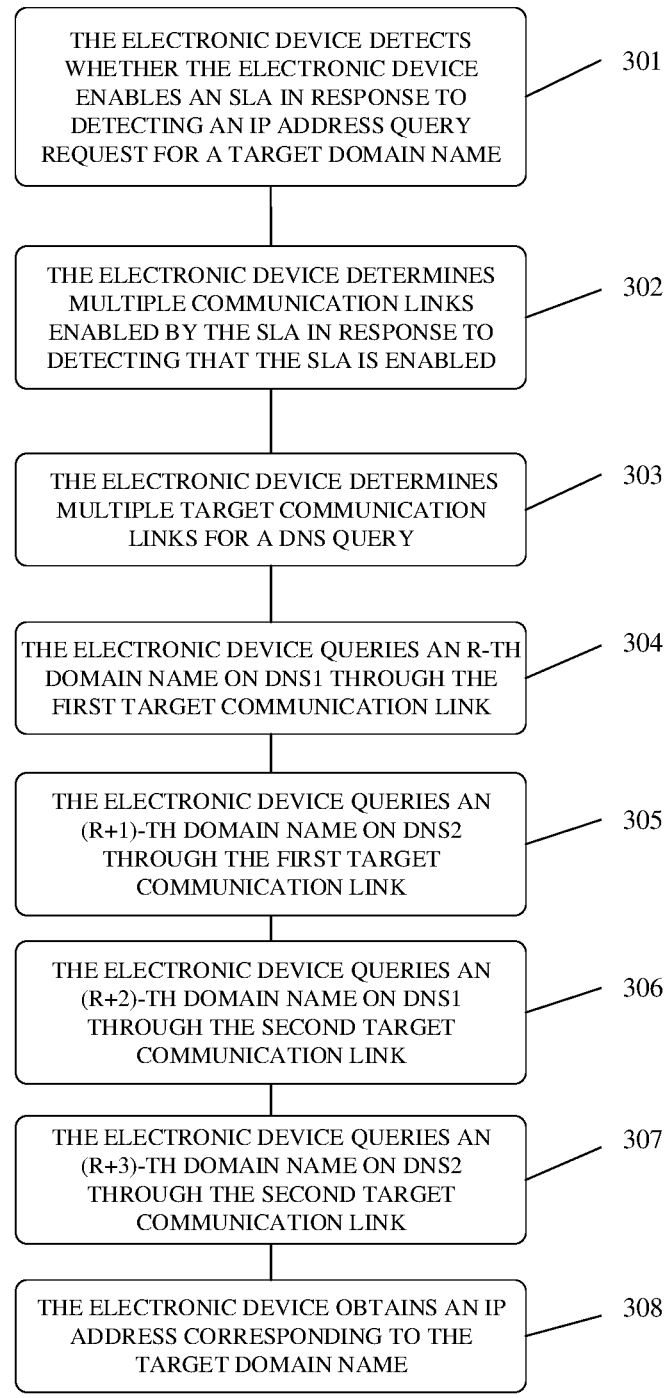
FIG. 3 is a schematic flow chart illustrating a method for domain name query according to other implementations.

FIG. 3 is a schematic flow chart illustrating a method for domain name query according to other implementations. The method is for an electronic device equipped with multiple DNS servers. In view of the implementation of FIG. 1, as illustrated in FIG. 3, the method begins at 301.

At 301, the electronic device detects whether the electronic device enables an SLA in response to detecting an IP address query request for a target domain name.

At 302, the electronic device determines multiple communication links enabled by the SLA in response to detecting that the SLA is enabled.

At 303, the electronic device determines multiple target communication links for a DNS query, where the multiple target communication links include a first target communication link and a second target communication link and the multiple DNS servers include DNS1 and DNS2.

At 304, the electronic device queries an R-th domain name on DNS1 through the first target communication link, where R is an integer greater than or equal to 1.

At 305, the electronic device queries an (R+1)-th domain name on DNS2 through the first target communication link.

At 306, the electronic device queries an (R+2)-th domain name on DNS1 through the second target communication link.

At 307, the electronic device queries an (R+3)-th domain name on DNS2 through the second target communication link.

At 308, the electronic device obtains an IP address corresponding to the target domain name.

According to the implementations, the electronic device detects whether the SLA is enabled in response to detecting the IP address query request for the target domain name, determines the multiple communication links enabled by the SLA in response to detecting that the SLA is enabled, and obtains the IP address corresponding to the target domain name by querying the multiple DNS servers through the at least one target communication link of the multiple communication links. According to the method for domain name query based on the SLA of the above solution, multiple query strategies achieve the multi-link based domain name query, so that, for the received domain name query request, the multi-link based domain name query can be performed. Therefore, the related method for domain name query can be optimized, query failures caused by the single-link based domain name query can be avoided, and a success rate and efficiency of the domain name query can be improved.

Furthermore, according to the implementation, the domain name query is performed through the multiple target communication links, where the multiple DNS servers are queried through one target communication link and then the multiple DNS servers are queried through the other target communication link, in this way, cross-query is achieved by performing multiple rounds of queries on the multiple DNS servers through each communication link. Through the above method for domain name query, multiple domain names in the multiple DNS servers can be queried in a short time, which improves the efficiency of the domain name query.

Figure 4:
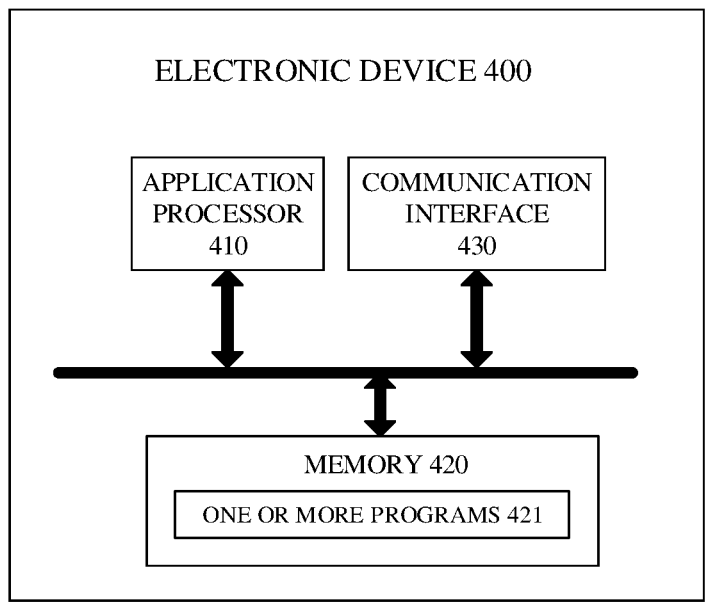
FIG. 4 is a schematic structural diagram illustrating an electronic device according to implementations.

FIG. 4 is a schematic structural diagram illustrating an electronic device 400 according to implementations. In view of the implementations of FIG. 1, FIG. 2, and FIG. 3, as illustrated in FIG. 4, the electronic device 400 includes at least one processor (such as an application processor 410), a memory 420, and a communication interface 430. The memory 420 is coupled to the at least one processor and configured to store computer executable instructions (such as one or more programs 421). The one or more programs 421 are configured to be executed by the application processor 410 and include instructions configured to perform the following operations.

The electronic device detects whether the electronic device enables an SLA in response to detecting an IP address query request for a target domain name. The electronic device determines multiple communication links enabled by the SLA in response to detecting that the SLA is enabled. The electronic device obtains an IP address corresponding to the target domain name by querying the multiple DNS servers through at least one target communication link of the multiple communication links.

According to the implementations, the electronic device detects whether the SLA is enabled in response to detecting the IP address query request for the target domain name, determines the multiple communication links enabled by the SLA in response to detecting that the SLA is enabled, and obtains the IP address corresponding to the target domain name by querying the multiple DNS servers through the at least one target communication link of the multiple communication links. According to the method for domain name query based on the SLA of the above solution, multiple query strategies achieve the multi-link based domain name query, so that, for the received domain name query request, the multi-link based domain name query can be performed. Therefore, the related method for domain name query can be optimized, query failures caused by the single-link based domain name query can be avoided, and a success rate and efficiency of the domain name query can be improved.

In at least one implementation, in terms of obtaining the IP address corresponding to the target domain name by querying the multiple DNS servers through the at least one target communication link of the multiple communication links, the instructions of the one or more programs are configured to perform the following operations. The electronic device determines multiple target communication links for a DNS query. The electronic device queries the multiple DNS servers through the multiple target communication links. The electronic device obtains the IP address corresponding to the target domain name.

In at least one implementation, in terms of determining the multiple target communication links for the DNS query, the instructions of the one or more programs are configured to perform the following operations. The electronic device selects the multiple target communication links from the multiple communication links according to a quality parameter of each of the multiple communication links. Alternatively, the electronic device queries a mapping relationship based on a link set containing the multiple communication links as a query identifier, wherein the mapping relationship comprises a correspondence between link sets and target communication links, and obtains the multiple target communication links corresponding to the link set.

In at least one implementation, the multiple target communication links include a first target communication link and a second target communication link, the multiple DNS servers include DNS1 and DNS2, and in terms of querying the multiple DNS servers through the multiple target communication links, the instructions of the one or more programs are configured to perform the following operations. The electronic device queries an R-th domain name on DNS1 through the first target communication link, where R is an integer greater than or equal to 1. The electronic device queries an (R+1)-th domain name on DNS2 through the first target communication link. The electronic device queries an (R+2)-th domain name on DNS1 through the second target communication link. The electronic device queries an (R+3)-th domain name on DNS2 through the second target communication link.

In at least one implementation, the multiple target communication links include a first target communication link and a second target communication link, the multiple DNS servers include DNS1 and DNS2, and in terms of querying the multiple DNS servers through the multiple target communication links, the instructions of the one or more programs are configured to perform the following operations. The electronic device queries an S-th domain name on DNS1 through the first target communication link, where S is an integer greater than or equal to 1. The electronic device queries an (S+1)-th domain name on DNS1 through the second target communication link. The electronic device queries an (S+2)-th domain name on DNS2 through the first target communication link. The electronic device queries an (S+3)-th domain name on DNS2 through the second target communication link.

In at least one implementation, the multiple target communication links include a first target communication link and a second target communication link, the multiple DNS servers include DNS1 and DNS2, and in terms of querying the multiple DNS servers through the multiple target communication links, the instructions of the one or more programs are configured to perform the following operations. The electronic device queries an M-th domain name on DNS1 through the first target communication link, where M is an integer greater than or equal to 1. The electronic device queries an (M+1)-th domain name on DNS2 through the first target communication link. The electronic device queries an (M+2)-th domain name on DNS1 through the second target communication link. The electronic device queries an (M+3)-th domain name on DNS2 through the second target communication link. The electronic device queries an (M+4)-th domain name on DNS1 through the first target communication link. The electronic device queries an (M+5)-th domain name on DNS1 through the second target communication link. The electronic device queries an (M+6)-th domain name on DNS2 through the first target communication link. The electronic device queries an (M+7)-th domain name on DNS2 through the second target communication link.

In at least one implementation, in terms of obtaining the IP address corresponding to the target domain name by querying the multiple DNS servers through the at least one target communication link of the multiple communication links, the instructions of the one or more programs are configured to perform the following operations. The electronic device determines one target communication link for a DNS query. The electronic device queries the multiple DNS servers through the one target communication link. The electronic device obtains the IP address corresponding to the target domain name.

In at least one implementation, in terms of determining one target communication link for the DNS query, the instructions of the one or more programs are configured to perform the following operations. The electronic device selects one target communication link from the multiple communication links according to a quality parameter of each of the multiple communication links. Alternatively, the electronic device queries a mapping relationship based on a link set containing the multiple communication links as a query identifier, wherein the mapping relationship comprises a correspondence between link sets and target communication links, and obtains one target communication link corresponding to the link set.

In at least one implementation, the quality parameter of each communication link includes link connection status, signal strength, and an information error rate of the communication link.

The foregoing solution of the implementations of the disclosure is mainly described from the viewpoint of execution process of the method. It can be understood that, in order to implement the above functions, the mobile terminal includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 5:
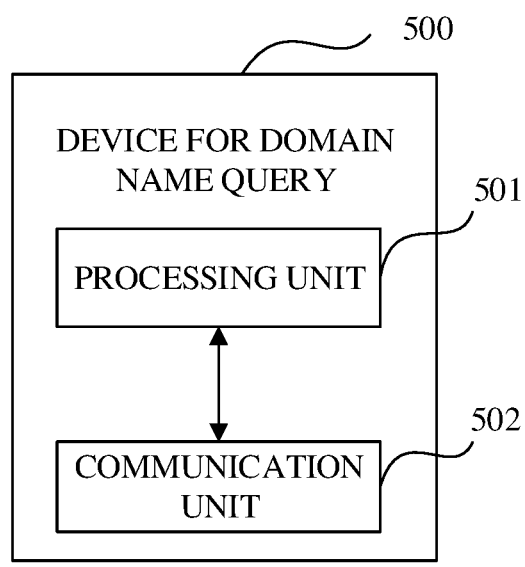
FIG. 5 is a block diagram illustrating functional units of a device for domain name query according to implementations.

FIG. 5 is a block diagram illustrating functional units of a device 500 for domain name query according to implementations. The device 500 is for an electronic device equipped with multiple DNS servers and includes a processing unit 501 and a communication unit 502.

The processing unit 501 is configured to: detect whether the electronic device enables an SLA in response to detecting an IP address query request for a target domain name; determine multiple communication links enabled by the SLA in response to detecting that the SLA is enabled; and obtain, via the communication unit 502, an IP address corresponding to the target domain name by querying the multiple DNS servers through at least one target communication link of the multiple communication links.

According to the implementations, the electronic device detects whether the SLA is enabled in response to detecting the IP address query request for the target domain name, determines the multiple communication links enabled by the SLA in response to detecting that the SLA is enabled, and obtains the IP address corresponding to the target domain name by querying the multiple DNS servers through the at least one target communication link of the multiple communication links. According to the method for domain name query based on the SLA of the above solution, multiple query strategies achieve the multi-link based domain name query, so that, for the received domain name query request, the multi-link based domain name query can be performed. Therefore, the related method for domain name query can be optimized, query failures caused by the single-link based domain name query can be avoided, and a success rate and efficiency of the domain name query can be improved.

In at least one implementation, the processing unit 501 configured to obtain the IP address corresponding to the target domain name by querying the multiple DNS servers through the at least one target communication link of the multiple communication links is configured to: determine multiple target communication links for a DNS query; query the multiple DNS servers through the multiple target communication links; and obtain the IP address corresponding to the target domain name.

In at least one implementation, the processing unit 501 configured to determine the multiple target communication links for the DNS query is configured to: select the multiple target communication links from the multiple communication links according to a quality parameter of each of the multiple communication links; or query a mapping relationship based on a link set containing the multiple communication links as a query identifier, wherein the mapping relationship comprises a correspondence between link sets and target communication links, and obtain the multiple target communication links corresponding to the link set.

In at least one implementation, the multiple target communication links include a first target communication link and a second target communication link, the multiple DNS servers include DNS1 and DNS2, and the processing unit 501 configured to query the multiple DNS servers through the multiple target communication links is configured to: query an R-th domain name on DNS1 through the first target communication link, where R is an integer greater than or equal to 1; query an (R+1)-th domain name on DNS2 through the first target communication link; query an (R+2)-th domain name on DNS1 through the second target communication link; and query an (R+3)-th domain name on DNS2 through the second target communication link.

In at least one implementation, the multiple target communication links include a first target communication link and a second target communication link, the multiple DNS servers include DNS1 and DNS2, and the processing unit 501 configured to query the multiple DNS servers through the multiple target communication links is configured to: query an S-th domain name on DNS1 through the first target communication link, where S is an integer greater than or equal to 1; query an (S+1)-th domain name on DNS1 through the second target communication link; query an (S+2)-th domain name on DNS2 through the first target communication link; and query an (S+3)-th domain name on DNS2 through the second target communication link.

In at least one implementation, the multiple target communication links include a first target communication link and a second target communication link, the multiple DNS servers include DNS1 and DNS2, and the processing unit 501 configured to query the multiple DNS servers through the multiple target communication links is configured to: query an M-th domain name on DNS1 through the first target communication link, where M is an integer greater than or equal to 1; query an (M+1)-th domain name on DNS2 through the first target communication link; query an (M+2)-th domain name on DNS1 through the second target communication link; query an (M+3)-th domain name on DNS2 through the second target communication link; query an (M+4)-th domain name on DNS1 through the first target communication link; query an (M+5)-th domain name on DNS1 through the second target communication link; query an (M+6)-th domain name on DNS2 through the first target communication link; and query an (M+7)-th domain name on DNS2 through the second target communication link.

In at least one implementation, the processing unit 501 configured to obtain the IP address corresponding to the target domain name by querying the multiple DNS servers through the at least one target communication link of the multiple communication links is configured to: determine one target communication link for a DNS query; query the multiple DNS servers through the one target communication link; and obtain the IP address corresponding to the target domain name.

In at least one implementation, the processing unit 501 configured to determine one target communication link for the DNS query is configured to: select one target communication link from the multiple communication links according to a quality parameter of each of the multiple communication links; or query a mapping relationship based on a link set containing the multiple communication links as a query identifier, wherein the mapping relationship comprises a correspondence between link sets and target communication links, and obtain one target communication link corresponding to the link set.

In at least one implementation, the quality parameter of each communication link includes link connection status, signal strength, and an information error rate of the communication link.

Implementations further provide a non-transitory computer readable storage medium. The non-transitory computer readable storage medium is configured to store a computer program for electronic data interchange. The computer program causes a processor of a computer to execute all or part of operations of the method of the above. The computer includes an electronic device.

Implementations further provide a computer program product. The computer program product includes a non-transitory computer-readable storage medium storing a computer program. The computer program is operable to cause the computer execute all or part of operations of the method of the above. The computer program product may be a software installation package. The computer includes an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable storage when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, disk, compact disc (CD), or the like.

It will be understood by those of ordinary skill in the art that all or a part of the various methods of the implementations described above may be accomplished by means of a program to instruct associated hardware, the program may be stored in a computer readable storage, which may include a flash memory, a ROM, a RAM, disk or CD, and so on.

The implementations of this application are described in detail above. Some examples are used herein to illustrate the principle and implementation manners of this application. The description of the above implementations is only used to help understand the method and core idea of this application. Meanwhile, for those of ordinary skill in the art, according to the idea of this application, there will be changes in the implementation manner and the application scope. In summary, contents of this specification should not be construed as a limitation on this application.

What is claimed is:

1. A method for domain name query for an electronic device connecting with a plurality of domain name system (DNS) servers, the method comprising:
    detecting whether the electronic device enables a link aggregation in response to detecting an Internet protocol (IP) address query request for a target domain name;
    determining a plurality of communication links used in the link aggregation in response to detecting that the link aggregation is enabled, wherein each communication link is a link, between the electronic device and one DNS server, for communication and DNS query;
    determining a plurality of target communication links for a DNS query, the plurality of target communication links comprising a first target communication link and a second target communication link, and the plurality of DNS servers comprising DNS1 and DNS2;
    querying a M-th domain name on DNS1 through the first target communication link, wherein M is an integer greater than or equal to 1;
    querying a (M+1)-th domain name on DNS2 through the first target communication link;
    querying a (M+2)-th domain name on DNS1 through the second target communication link;
    querying a (M+3)-th domain name on DNS2 through the second target communication link;
    querying a (M+4)-th domain name on DNS1 through the first target communication link;
    querying a (M+5)-th domain name on DNS1 through the second target communication link;
    querying a (M+6)-th domain name on DNS2 through the first target communication link;
    querying a (M+7)-th domain name on DNS2 through the second target communication link; and
    obtaining an IP address corresponding to the target domain name,
    wherein determining the plurality of target communication links comprises:
        querying a mapping relationship based on a link set containing the plurality of communication links as a query identifier, wherein the mapping relationship comprises a correspondence between link sets and target communication links; and
        obtaining the plurality of target communication links corresponding to the link set.

2. The method of claim 1, wherein determining the plurality of target communication links comprises:
    selecting the plurality of target communication links from the plurality of communication links according to a quality parameter of each of the plurality of communication links.

3. The method of claim 2, wherein the quality parameter of each communication link comprises link connection status, signal strength, and an information error rate of the communication link.

4. An electronic device, connecting with a plurality of domain name system (DNS) servers and comprising:
    at least one processor; and
    a memory coupled to the at least one processor and storing computer executable instructions thereon which, when executed by the at least one processor, causes the at least one processor to:
        detect whether the electronic device enables a link aggregation in response to detecting an Internet protocol (IP) address query request for a target domain name;

determine a plurality of communication links used in the link aggregation in response to detecting that the link aggregation is enabled, wherein each communication link is a link, between the electronic device and one DNS server, for communication and DNS query;

determine a plurality of target communication links for a DNS query, the plurality of target communication links comprising a first target communication link and a second target communication link, and the plurality of DNS servers comprising DNS1 and DNS2;

query a M-th domain name on DNS1 through the first target communication link, wherein M is an integer greater than or equal to 1;

query a (M+1)-th domain name on DNS2 through the first target communication link;

query a (M+2)-th domain name on DNS1 through the second target communication link;

query a (M+3)-th domain name on DNS2 through the second target communication link;

query a (M+4)-th domain name on DNS1 through the first target communication link;

query a (M+5)-th domain name on DNS1 through the second target communication link;

query a (M+6)-th domain name on DNS2 through the first target communication link;

query a (M+7)-th domain name on DNS2 through the second target communication link; and obtain an IP address corresponding to the target domain name, wherein determine the plurality of target communication links comprises:

query a mapping relationship based on a link set containing the plurality of communication links as a query identifier, wherein the mapping relationship comprises a correspondence between link sets and target communication links; and obtain the plurality of target communication links corresponding to the link set.

5. The electronic device of claim 4, wherein the at least one processor configured to determine the plurality of target communication links for the DNS query is configured to:

select the plurality of target communication links from the plurality of communication links according to a quality parameter of each of the plurality of communication links.

6. The electronic device of claim 5, wherein the quality parameter of each communication link comprises link connection status, signal strength, and an information error rate of the communication link.

7. A non-transitory computer readable storage medium storing a computer program which, when executed by a processor of an electronic device connecting with a plurality of domain name system (DNS) servers, causes the processor to:

detect whether the electronic device enables a link aggregation in response to detecting an Internet protocol (IP) address query request for a target domain name;

determine a plurality of communication links used in the link aggregation in response to detecting that the link aggregation is enabled, wherein each communication link is a link, between the electronic device and one DNS server, for communication and DNS query;

determine a plurality of target communication links for a DNS query, the plurality of target communication links comprising a first target communication link and a second target communication link, and the plurality of DNS servers comprising DNS1 and DNS2;

query a M-th domain name on DNS1 through the first target communication link, wherein M is an integer greater than or equal to 1;

query a (M+1)-th domain name on DNS2 through the first target communication link;

query a (M+2)-th domain name on DNS1 through the second target communication link;

query a (M+3)-th domain name on DNS2 through the second target communication link;

query a (M+4)-th domain name on DNS1 through the first target communication link;

query a (M+5)-th domain name on DNS1 through the second target communication link;

query a (M+6)-th domain name on DNS2 through the first target communication link;

query a (M+7)-th domain name on DNS2 through the second target communication link; and obtain an IP address corresponding to the target domain name, wherein determine the plurality of target communication links comprises:

query a mapping relationship based on a link set containing the plurality of communication links as a query identifier, wherein the mapping relationship comprises a correspondence between link sets and target communication links; and obtain the plurality of target communication links corresponding to the link set.

* * * * *